United States Patent [19]
Thompson et al.

[11] Patent Number: 5,877,995
[45] Date of Patent: Mar. 2, 1999

[54] GEOPHYSICAL PROSPECTING

[75] Inventors: Arthur Howard Thompson; Grant Alan Gist, both of Houston, Tex.

[73] Assignee: Exxon Production Research Company, Houston, Tex.

[21] Appl. No.: 696,059

[22] Filed: May 6, 1991

[51] Int. Cl.[6] .................................................. G01V 11/00
[52] U.S. Cl. ........................... 367/14; 324/323; 324/334; 367/25
[58] Field of Search ................................. 367/14, 191, 25; 324/323, 354, 334; 181/106, 102, 108, 113

[56] References Cited

U.S. PATENT DOCUMENTS

| | | | |
|---|---|---|---|
| 2,156,259 | 5/1939 | Blau | 367/14 |
| 2,172,557 | 9/1939 | Evjen | 324/354 |
| 2,172,778 | 9/1939 | Taylor, Jr. | 324/354 |
| 3,392,327 | 7/1968 | Zimmerman, Jr. | 324/323 |
| 3,660,754 | 5/1972 | Tsao et al. | 324/323 |
| 4,009,609 | 3/1977 | Sayer et al. | 367/14 |
| 4,583,095 | 4/1986 | Peterson | 342/26 |
| 4,904,942 | 2/1990 | Thompson | 367/14 |

OTHER PUBLICATIONS

NSF Report Jan. 27, 1988 by H. F. Morrison and T. Asch.
The Journal of Chemical Physics, vol. 43, No. 6, pp. 2111–2115 (1954) by Morrison et al.
Journal of Non–Equilibrium Thermodynamics, vol. 14, No. 4, pp. 345–354 (1989) by de las Nieves et al.
Journal of Colloid and Interface Science, 59, p. 149 [1977], by John L. Anderson and Wei–Hu Koh.
Journal of Acoustic Society of America 77 (6), p. 2012 [1985], by A.N. Norris.

Primary Examiner—Ian J. Lobo

[57] ABSTRACT

Method and apparatus are provided for a new type of geophysical prospecting. The method applies an electric field to a fluid-containing porous subsurface formation to create a fluid pulse from changes in the polarization of pore fluid dipoles. The fluid pulse propagates in the subsurface as a seismic wave that may be detected by an appropriate array of seismic detectors. The apparatus is a pulsed DC or AC source for generating an applied electric field and a seismic detector.

29 Claims, 3 Drawing Sheets

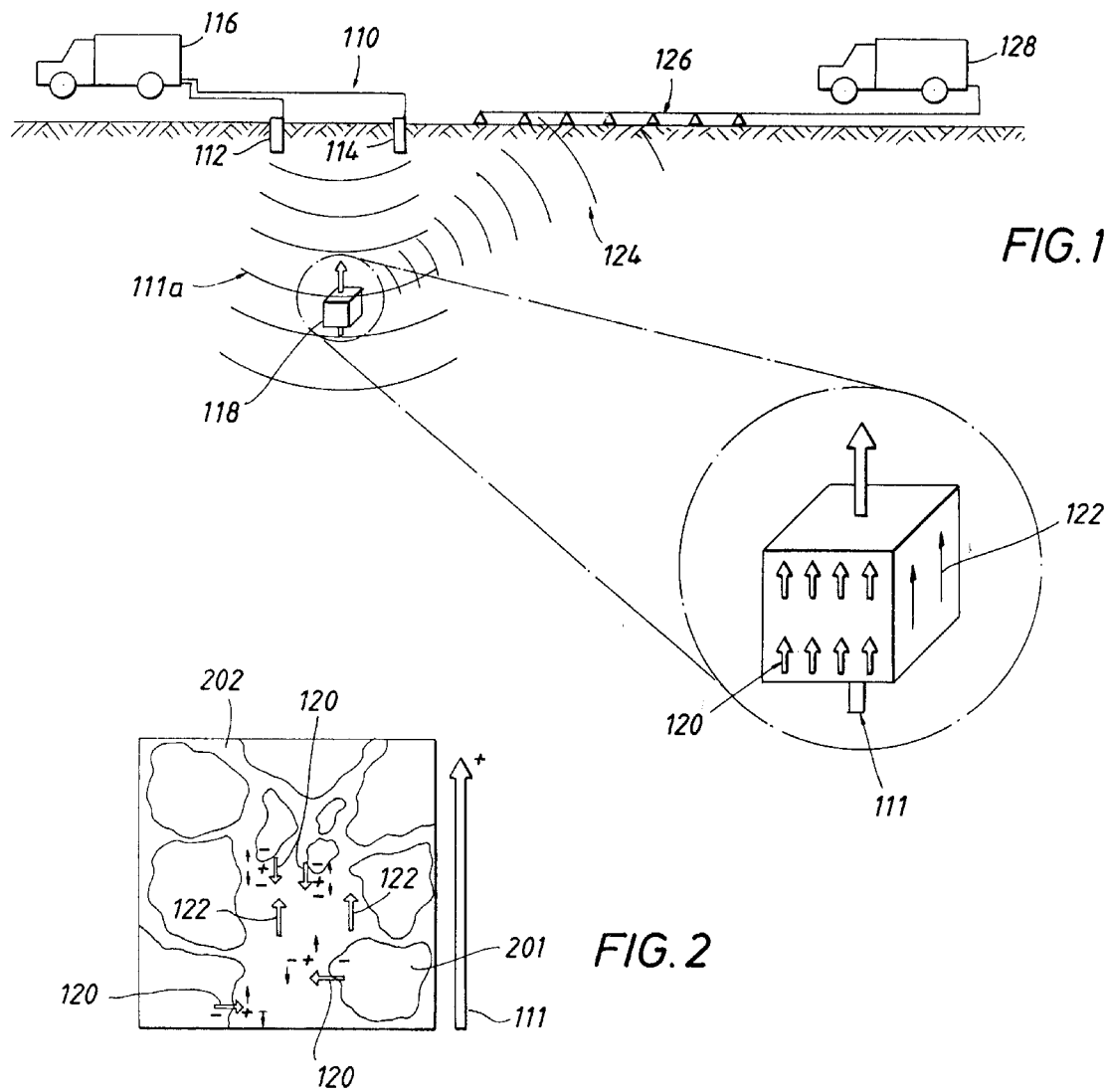
FIG. 1
FIG. 2
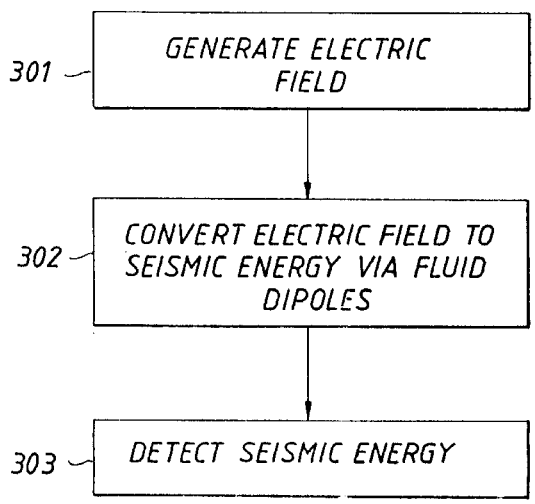
FIG. 3

GEOPHYSICAL PROSPECTING

BACKGROUND OF THE INVENTION

This invention relates to geophysical prospecting, and more particularly relates to geophysical prospecting by detection of acoustic responses generated by an electric field.

Conventional seismic prospecting techniques for land involve the use of an appropriate source to generate seismic energy and a set of receivers spread out along or near the earth's surface to detect any seismic signals due to seismic energy being reflected from subsurface geologic boundaries. These signals are recorded as a function of time, and subsequent processing of these signals, i.e. seismic data, is designed to reconstruct an appropriate image of the subsurface. In simplistic terms, this conventional process has seismic energy traveling down into the earth, reflecting from a particular geologic layer (impedance contrast), and returning to the receiver as a reflected seismic wave.

The seismic energy may be so-called shear waves (S-waves) or so-called compressional waves (P-waves). Shear waves and compressional waves differ with respect to their velocities, angles of reflection, vibrational directions, and to some extent the types of information that may be obtained from their respective types of seismic data. However, both types of waves suffer similar attenuation by earth formations; that is, the earth formations tend to attenuate the higher frequency components and allow the lower frequency components to pass through the earth relatively unattenuated. This means that for deeper formations the low frequency content of the reflected seismic energy contains the information about the underlying subsurface formations. However, because of the low frequency of the detected reflected seismic energy, the resolution of the reflected seismic energy may be insufficient to allow for detection of very thin geologic layers.

Further, if the impedance contrast between adjacent but distinct geologic layers is very small, very little seismic energy is reflected and the distinctness of the geologic layers may not be discernable from the detected or recorded seismic data. Thus, efforts continue to be made to appropriately image subsurface layers by geophysical prospecting techniques other than by seismic prospecting techniques alone.

A new technique for geophysical prospecting is described in U.S. Pat. No. 4,904,942 to A. H. Thompson issued Feb. 27, 1990. This patent describes a method for petroleum exploration involving generating an electric field in a fluid-containing porous earth formation with a seismic wave. More particularly, the pressure gradient associated with a seismic wave causes fluid to flow in the pores of a porous rock formation. When the fluid contains charged species, the flow produces a distortion of electric dipole layers and thereby an electric field. The resulting electric field propagates to the surface of the earth where it may be detected with electromagnetic sensors.

This so-called electroseismic prospecting technique may provide additional information about subsurface geologic layers, but will be most sensitive to high permeability fluid-filled layers. This electroseismic technique is not sensitive to low permeability shales or shaly rocks. Thus, this technique will not be able to determine whether or not the detected, porous proposed reservoir layer is capped by a low permeability sealing layer, or what low permeability layer may be the source of the petroleum fluids, if any, in the proposed reservoir layer.

In addition, there have been published articles discussing the theory and use of electrokinetic effects. In general, these articles describe laboratory devices designed to convert electrical energy into acoustic or electromechanical energy. For example, one such device is a micropipette apparatus employing a porous material containing fluid where an applied electric field causes the porous material to eject a very small quantity of the fluid. Such laboratory devices find limited applicability due to their low efficiencies compared to conventional loudspeakers and pumps.

These and other limitations and disadvantages of the prior art are overcome by the present invention, however, and improved methods and apparatus are provided for geophysical prospecting.

SUMMARY OF THE INVENTION

In a preferred embodiment of the present invention, method and apparatus are provided for a new type of geophysical prospecting. More particularly, an electric field is generated by a power source and interacts with a fluid-containing porous subsurface layer which changes the polarization of pore fluid dipoles in that porous formation layer, which in turn cause a fluid pressure pulse. The fluid pressure pulse produces a time varying pressure gradient in the pores of the earth formation that is transmitted to the earth formation or rock; the rock pressure pulse then propagates through the subsurface as a seismic wave. Such a seismic wave may be detected by an appropriate seismic detector or array of seismic detectors.

It is an object of the present invention to provide a new method for geophysical prospecting.

It is an object of the present invention to provide a method for geophysical prospecting, comprising, generating an electric field, converting said electric field to a seismic wave in at least one porous subsurface earth formation containing at least one fluid, and detecting said seismic wave.

It is a further object of the present invention to provide a new method of geophysical prospecting using both the electro-osmotic and acoustoelectric coupling techniques.

It is an additional object of the present invention to provide a new seismic source.

It is yet another object of the present invention to provide a new method for well logging.

It is also an object of the present invention to provide apparatus for a new type of geophysical prospecting.

These and other objects and advantages of the present invention will become apparent from the following detailed description, wherein references are made to the figures in the accompanying drawings.

IN THE DRAWINGS

FIG. 1 is a simplified functional diagram of a preferred embodiment of the present invention depicting apparatus and procedure on a cross-sectional view of the earth.

FIG. 2 is a partial cross-sectional view of a porous formation suitable for generating a seismic wave in response to an electric field stimulation in accordance with the teachings of the present invention.

FIG. 3 is a simplified block diagram depicting the steps of a method of geophysical prospecting in accordance with the teachings of the present invention.

DETAILED DESCRIPTION

Figures 4, 5:
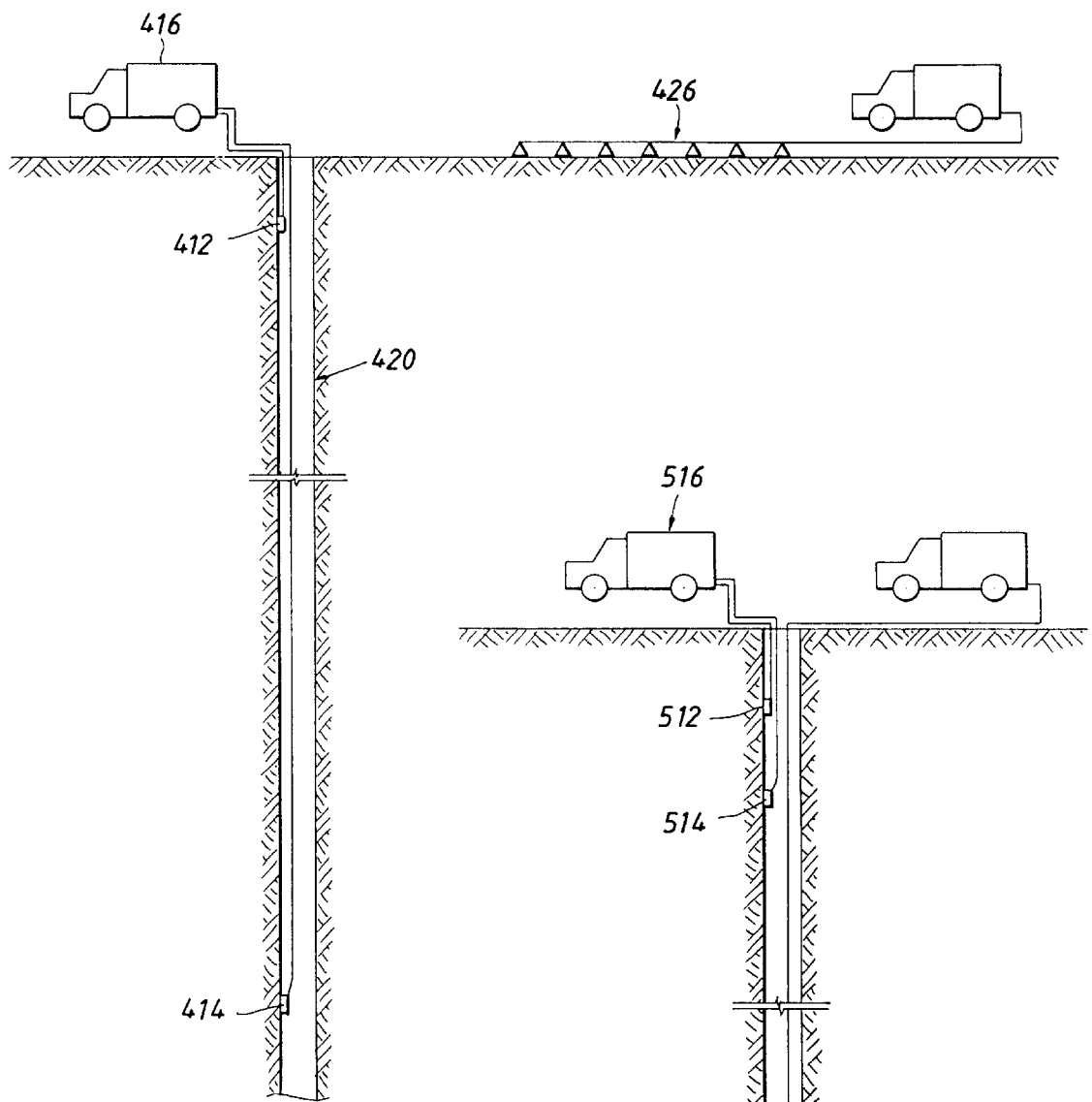
FIG. 4 is a simplified schematic representation of another arrangement of the components of FIG. 1 in accordance with the teachings of the present invention.
FIG. 5 is a simplified schematic representation of a different arrangement of the components of FIG. 1 in accordance with the teachings of the present invention.

Referring now to FIG. 1, there may be seen a simplified arrangement of the apparatus illustrating a preferred embodiment of the present invention. More particularly, it may be seen that there is an antenna 110 suitably disposed on or near the surface of the earth to generate an electric field 111. This "antenna" is illustrated in FIG. 1 as two metal electrodes 112, 114 partially buried in the earth. Two or more such electrodes may be employed, and the electrodes may be above or below the water table (not depicted). When two electrodes are employed, the electrodes may be spaced from about 15 feet to about 25,000 feet apart. Preferably, the electrodes are below the first water table. In addition, a large or very large loop of wire (not depicted) laid on the surface of the earth and carrying a large current may be employed as an antenna; similarly, one (or more) large coil(s) of wire (not depicted), with or without a ferromagnetic core, may be buried in the subsurface (preferably below the water table) and employed as an antenna.

A pulsed DC source or an AC source 116 may be connected to the antenna to generate a current (not depicted) in or adjacent the earth that generates the applied electric field 111. The frequency of such a source may be from about 1 milliHz to about 30 KHz. The applied electric field 111 is associated with an electromagnetic field 111a resulting from the current. This electric field 111 then propagates down into the subsurface earth. It should be noted that this electromagnetic wave, unlike an acoustic wave, travels with the speed of light in the subsurface. The speed of light in the subsurface is less than the speed of light in a vacuum or air. The electromagnetic wave in the subsurface will typically travel at a speed approximately one hundred times greater than the speed of propagation for an acoustic wave, in the seismic frequency band of about 10–100 Hz.

This applied electric field 111 encounters fluid dipoles 120 associated with at least one fluid in a porous earth formation layer. A portion 118 of this formation layer is depicted in an exploded view in FIG. 1. This applied electric field causes a change in the polarization of the dipoles 120 in the pore fluid, which in turn causes the fluid to flow or to generate a pressure pulse 122. The flowing fluid (or pulse) produces a time varying pressure gradient, which is then propagated into the earth formation (or rock). The pressure gradient then propagates through the subsurface, including to the surface, as a seismic wave 124. The term "seismic wave" is used herein to mean any mechanical wave that propagates in the subsurface of the earth, and includes, but is not limited to, P- and S-waves. This seismic wave is detected by an appropriate seismic detector 126 positioned on or in the surface of the earth; this seismic detector may be an array of detectors, with such detectors being hydrophones or geophones. The geophones may be single or multi-component geophones, i.e., have one or more axes of sensitivity such as vertical, in-line horizontal, and cross-line horizontal.

The signals representing the detection of the seismic wave may be suitably recorded by a conventional seismic field recorder (not depicted), usually contained in a recording vehicle 128. These signals may be processed according to conventional seismic techniques to recover travel time, depth and/or velocity information, as well as subsurface lithology information. Since the recording, analysis, and display of such data (before, during, and/or after processing) is well known in the art, it will not be discussed in any detail herein.

The formation itself is porous, as is more clearly illustrated in FIG. 2. That is, there are solid rock portions 201 interspersed throughout with channel-like porous spaces 202. The term "porous" is used herein to mean some earth substance containing non-earthen volume or pore space, and includes, but is not limited to consolidated, poorly consolidated, or unconsolidated earthen materials. Where aqueous or polarizable fluid exists, an electrochemical bond may be formed between the aqueous or polarizable fluid and the solid rock portions 201. Such aqueous or polarizable fluid may be, but are not limited to, water, brine, hydrocarbons, petroleum, or combinations thereof. This electrochemical bond is represented by the "+" symbol in the fluid portion and the "−" symbol in the rock portion of the formation. In general, the rock portion 201 has an existing natural surface charge. This electrochemical bond may result in a local pore fluid dipole that causes a local background pre-existing electric field. It should be noted that, overall, there is no net dipole in unperturbed rock and its associated fluids.

The sign of the background pre-existing electric field or field polarity direction depends on the surface charge on the solid and the way the fluid screens out that charge. In clays, the charge is typically as shown in FIG. 2. However, in carbonates, the charge could well be reversed, i.e., with the "+" charge on the solid.

When the applied electric field 111 interacts with the formation, as illustrated for a region of the formation, there is a change in the background electric field that acts upon the established fluid dipole 120 or the charges associated with that dipole, causing fluid movement. This is illustrated by the applied electric field 111 from the electromagnetic wave 111a shown in FIG. 1 and FIG. 2. Although the applied electric field 111 may be a "pulsed" or "AC" field (i.e., resulting from a pulsed DC source or an AC source), the applied electric field 111 depicted in FIGS. 1 and 2 is a static electric field for ease of illustration purposes. This applied electric field 111 has the effect of modifying the electrochemical bonds or moving the charges (depicted by the small arrows above and below the "charges" in the fluid in FIG. 2), thereby effectively creating a pressure pulse where the bonds are distorted or broken. This applied electric field 111 is throughout the fluid area and primarily affects the charges of the dipoles 120 which are at or near the fluid surface or interface of the rock. Thus, a pore fluid pressure pulse is generated from the resulting charge movement and this resulting pressure pulse is transmitted to the solid rock portions of the formation. In turn the pressure pulse is transmitted through the rock portions as a seismic wave 124. Thus, an appropriate subsurface formation layer may be a subsurface source of seismic energy.

A portion of this seismic energy may travel upwardly from the formation (seismic wave 124) towards the surface, where it may be detected by a seismic detector or an array of detectors. Of course, if there are conventional seismic reflection boundaries between the formation and surface, seismic reflections may occur and may be detected by the detector array, also in a conventional fashion. The detection of the resulting subsurface generated seismic wave, however, will occur whenever there is fluid in a porous formation, preferably of low permeability.

Thus, one embodiment of the present invention provides a method for generating subsurface seismic energy by generating an electric field between electrodes located in or at the surface of the earth. As noted later herein, the electrodes may also be placed in a borehole to generate seismic energy. This electric field is then converted to seismic energy when it interacts with pore fluid dipoles in a porous subsurface formation layer containing at least one fluid.

When both the detectors and the electrodes are located at the surface of the earth, as illustrated in FIG. 1, detected seismic response indicates the presence of a fluid-containing subsurface layer. By analyzing the detected seismic response, it is possible to determine how many such layers are present and the depth of such layers.

It is possible to "tune" the wavelength and/or amplitude of the applied electric field to select the depth to which the field effectively penetrates the earth. In general, electric fields with longer wavelengths and from higher currents will propagate deeper into the earth.

The amplitude and frequency content of the seismic wave generated at a fluid-containing subsurface layer is expected to be dependent upon the frequency of the applied electric field, the thickness of the layer, and the depth of the layer. By analyzing the frequency content of the detected seismic wave, a measure of the permeability of the layer that generated the seismic wave may be determined.

As previously noted, the electric field may be the electric field associated with an electromagnetic wave. Accordingly, a pulsed DC current source or an AC current source may be suitably connected to an antenna or electrodes to generate the electromagnetic field. The frequency of the pulses or AC frequency of the source may be adjusted and the magnitude of the current may be adjusted.

For an AC source, the frequency may be swept through a range of frequencies, analogous to the sweep frequencies of a seismic vibrator. An AC source may consist of a signal function generator and an amplifier sufficient to amplify the AC signal to a current and voltage level required to generate a field of sufficient strength for the subsurface area of interest. An AC source may also consist of a constant speed or variable speed motor-driven AC generator.

A pulsed DC source may consist of a signal pulse generator and an amplifier sufficient to amplify the DC pulse to a current and voltage level required to generate a field of sufficient strength for the subsurface area of interest.

The frequency range of such a source should be from about 1 milliHz to about 30 KHz; conventional seismology employs a frequency range of from about 1 Hz to about 100 Hz. As noted before, the frequency selected for the source may be influenced by the desired depth of penetration of the electric field; for very deep or deep formations frequencies down to about 0.1 Hz may be employed.

A suitable amplifier would be one of the type typically used to amplify signals for high-power public address or music amplification systems as found in theaters, stadiums, or other outdoor public gatherings. The types of electrodes to be employed in the methods of the present invention are those used as a controlled source for audio-frequency magnetotelluric or electromagnetic prospecting or surveying. When two electrodes are employed, the electrodes may be spaced from about 15 feet to about 25,000 feet apart. When more than two electrodes are employed, the interelectrode spacing may vary from this range but the overall length and/or width of the array of electrodes should be of about this same range.

An array of electrodes may be employed to generate a specific type or orientation of electric field. More particularly, the array may be analogous to a fixed phase array and by suitably adjustable electronic delays a steerable electric field may be generated. Alternatively, a plane wave may be generated that propagates down into the subsurface.

Referring now to FIG. 3, there may be seen a simplified block diagram of the presently preferred steps of a method for geophysical prospecting according to the teachings of the present invention. More particularly, it may be seen that the first step 301 is generating an electric field. This electric field may be generated, as noted hereinbefore, by placing electrodes into or on the surface of the earth and then passing a current through these electrodes from a current or power source. This current produces an electromagnetic wave, and the electric wave associated with this electromagnetic wave is the electric field which then penetrates the subsurface of the earth. The electrodes should preferably partially penetrate into subsurface earth and, more preferably, should be disposed below the first water table.

The next step 302 of the presently preferred method of the present invention is to convert this electric field to seismic energy via fluid dipoles in a porous subsurface earthen layer containing at least one fluid. As noted hereinbefore, this fluid may be hydrocarbons, water, brine, other petroleum related fluids, or any mixture or combination of these fluids. As described hereinbefore, the applied electric field encounters fluid dipoles associated with at least one fluid in a porous earth formation layer. This applied electric field causes a change in the polarization of fluid dipoles and results in a pressure pulse which in turn results in a seismic wave.

The next step 303 in the presently preferred method of the present invention is to detect this generated seismic energy. This seismic energy may be appropriately detected by placing a detector or detector array on or near the surface of the earth. This detector and/or array may consist of any appropriate seismic detector(s). More particularly, appropriate seismic detectors may be hydrophones or geophones. The geophones may have one or multiple axes of sensitivity. This detector or array receives the seismic energy which has been converted from the electric field in a subsurface porous earthen layer containing at least one fluid.

In summary, a presently preferred method of the present invention for geophysical prospecting is to generate an electric field, convert this electric field to seismic energy at a subsurface porous formation containing at least one fluid, and then to detect this generated seismic energy.

In conjunction with this preferred method of geophysical prospecting it may be noted that the apparatus necessary to perform this method consists basically of the antenna, electrodes or the electrode array and a current or power source that may be a pulsed DC or AC source and a suitable seismic detector or array of seismic detectors located on or near the surface of the earth. Clearly, this is the most efficient way to practice the present invention when there are no boreholes penetrating the subsurface; a discussion of the apparatus and method as modified when boreholes are present will be discussed later herein.

A brief explanation of what is currently believed to be the basis for the present invention is as follows. When a pressure gradient is applied to a porous fluid-filled rock, an electric field may be generated. This resulting coupling may be called acoustoelectric coupling or a streaming potential. When an electric field is applied to a porous fluid-filled rock, a pressure gradient may be generated. This coupling may be referred to as electroacoustic coupling or an electro-osmotic effect. A coupling coefficient may be used to relate the amount or degree of coupling for each of these two processes.

The acoustoelectric coupling coefficient is presently expected to be much larger than the electroacoustic coefficient for rocks with high permeabilities, i.e., above a few milli-Darcy (mD). This is due to the different volumes of pore fluid that can respond to the excitation. In the acoustoelectric case, the entire fluid volume responds to an applied pressure gradient. In the electroacoustic case, only the charged fluid in the immediate neighborhood of the pore wall responds to an applied electric field. For this reason, the efficiency of generation of fluid motion from an applied electric field is not the same as the efficiency of generation of an electromagnetic wave from flowing fluid caused by a pressure wave.

A more detailed explanation of what is currently believed to be the basis for the present invention is as follows. Phenomenological models of the electrokinetic effects of fluids in porous materials have been studied in some detail for many years. More particularly, a paper by John L. Anderson and Wei-Hu Koh discusses these models (Journal of Colloid and Interface Science, 59, 149 [1977]). The fundamental equations connecting currents and fields are the Onsager equations. For fluid flow and electrical currents in straight tubes, the relationships are as follows:

$$Q = \frac{A}{l}\left(\frac{k}{\eta}\Delta P + \alpha \Delta V\right) \quad (1)$$

$$I = \frac{A}{l}(\alpha \Delta P + \beta \sigma_0 \Delta V), \quad (2)$$

where, Q=volume flow [m$^3$/sec], A=pore area [m$^2$], l=pore length [m], k=permeability [m$^2$]=r$^2$/8 for tubes (note that 1 m$^2$=10$^{15}$ mD), η=absolute viscosity [kg/m-sec], ΔP=pressure difference across sample [N/m$^2$], α=electro-osmotic coefficient or electro-osmotic mobility [m$^2$/V-sec], ΔV=voltage difference across sample [V], I=electrical (ionic) current [C/sec], β=conductivity enhancement ratio [dimensionless]=

$$\frac{\text{conductivity of a tube with surface charges}}{\text{conductivity of the same tube with no charges}},$$

and σ$_0$=brine conductivity [(Ω-m)$^{-1}$].

The electroacoustic coefficient is obtained by setting the fluid flow of equation 1 to zero giving $$\frac{\Delta V}{\Delta P} = \frac{-k}{\eta \alpha}. \quad (3)$$

For typical values of water in cylindrical (radius of ten microns) tubes of quartz this results in $$\frac{\Delta V}{\Delta P} = 10^4 \text{ V/bar} \quad (4)$$

Thus, it may be seen that for straight tubes of quartz 10 microns in radius it would require about 10$^4$ volts to generate a pressure of one atmosphere. For smaller capillaries and larger surface charges, the product of these variables may be significantly larger so that this coefficient could be smaller than 10 volts per bar. This smaller value of 10 volts per bar suggests that a sizable acoustic pressure gradient may be generated at reasonable voltages. Similarly, for the example of a berea sandstone having a permeability of 300 mD and typical values of water, the electroacoustic coupling coefficient is on the order of 10$^3$ volts per bar. However, for rocks having pore structures with permeabilities on the order of 3×10$^{-3}$ mD the electroacoustic coefficient is approximately 0.3 volts per bar.

Thus, for low or very low permeability rock, 0.3 volts can generate one atmosphere of pressure. This pressure generated in a pore fluid may be effectively coupled to the rock matrix to provide a source of seismic energy. The problem of coupling or converting fluid pressure variation to an acoustic wave is discussed in "Radiation from a Point Source and Scattering Theory in a Fluid Saturated Porous Solid", A. N. Norris (Journal of Acoustic Society of America 77 (6), 2012 [1985]). Norris discusses two kinds of impulsive sources: (1) a point load displacement applied only to the solid component, and (2) a point load displacement applied to the fluid. Both of these sources generate P-waves and S-waves. For frequencies of interest to seismic exploration, the ratio of fluid to solid displacement for a compressional wave is approximately 1, meaning that the same P-wave is generated when the load (pressure variation) is applied to the fluid as when the load is applied to the solid. In general, the same result holds for the S-wave.

Thus, when the electroacoustic coupling coefficient is large, there will be an efficient generation of propagating seismic waves. In particular, the conversion from a local pressure variation in the fluid to a propagating seismic wave does not involve any additional dependence upon permeability. Thus, low permeability rocks can be expected to be good sources for this electroacoustic conversion.

Laboratory results confirm that the induced pressure produced by an electromagnetic wave in the earth can be estimated from the previously described equations. Using these equations, the expected acoustic response of a subsurface earth formation (stimulated by an applied electric field) has been compared to conventional seismic reflection amplitudes. For one particular model, an antenna of 100 meters in length with an AC current of 100 amps and frequencies in the seismic band of frequencies (10–100 Hz) was used. The expected pressure generated at a formation down to a depth of 1,000 meters for the electromagnetically induced pressure gradient and for that induced by a 1 lb. dynamite shot were found to be of the same order of magnitude.

Thus, this model demonstrates that the electromagnetically induced seismic wave amplitude can have the same order of magnitude amplitude as a conventional seismic reflection from the same formation. Further, the electroacoustic effect is expected to be frequency dependent (for frequencies of interest for seismic exploration) in an inhomogeneous rock or a rock with a distribution of pore sizes. The induced pressure gradient is proportional to the frequency of the applied electric field. Thus, the resulting seismic wave generated by the electric field may have a sufficiently high frequency (up to about twice that of the electric field) so as to enhance resolution of thin geologic layers.

Thus, it may be seen that in another embodiment, the present invention provides a method for geophysical prospecting by generating an electric wave, converting that electric wave into a seismic wave in a fluid-containing porous subsurface geologic layer, and detecting the so-generated seismic wave. Further, the electric wave may be associated with an electromagnetic wave and may be generated by an appropriate current passing through the earth.

Now referring to FIG. 4, an alternate placement of the electrodes 412, 414 for generating an electric field 111, relative to the seismic detectors 426 is shown. In FIG. 4, the electrodes 412, 414 are placed in a well bore 420 penetrating the subsurface of the earth. Although two electrodes are depicted, more than two electrodes may be so employed.

Further, even though the two electrodes are depicted with one near the top of the well bore and the other near the bottom of the well bore, the electrodes may be located proximate each other and be positioned at any depth along the borehole. FIG. 4 also depicts the seismic detector array 426 laid out along the surface of the earth. Clearly, the positions of the electrodes (in the borehole) and the array (on the earth's surface) may be interchanged so as to have the array in the borehole and the electrodes on or near the earth's surface.

Referring now to FIG. 5, both the seismic detector array 526 and the electrodes 512, 514 are located in a single borehole 520. Clearly, the relative locations of the array and electrodes may be interchanged. Further, the electrodes and array may physically overlap either partially or completely. Again, any number of electrodes may be employed. Preferably, the electrodes and array may be part of a single well logging tool (not depicted) that may be employed in a conventional manner to log fluid-containing porous layers penetrated by the borehole using the electroacoustic effect of the present invention.

Thus, it may be seen that another embodiment of the present invention provides a method for logging the borehole by generating an electric field adjacent to the well bore, converting that electric field to a seismic wave at a porous subsurface earth formation layer containing fluid adjacent the well bore, and detecting the resulting seismic waves in the well bore. Further, it should be noted that since the frequency of the seismic wave that is generated may be in the same frequency range as conventional seismic prospecting techniques, the information obtained by well logging with this method should be more easily matched or "tied" to seismic cross-sections than conventional well log information; the seismic cross-sections may be obtained before, during or after the drilling of the borehole which has been logged.

Figure 6:
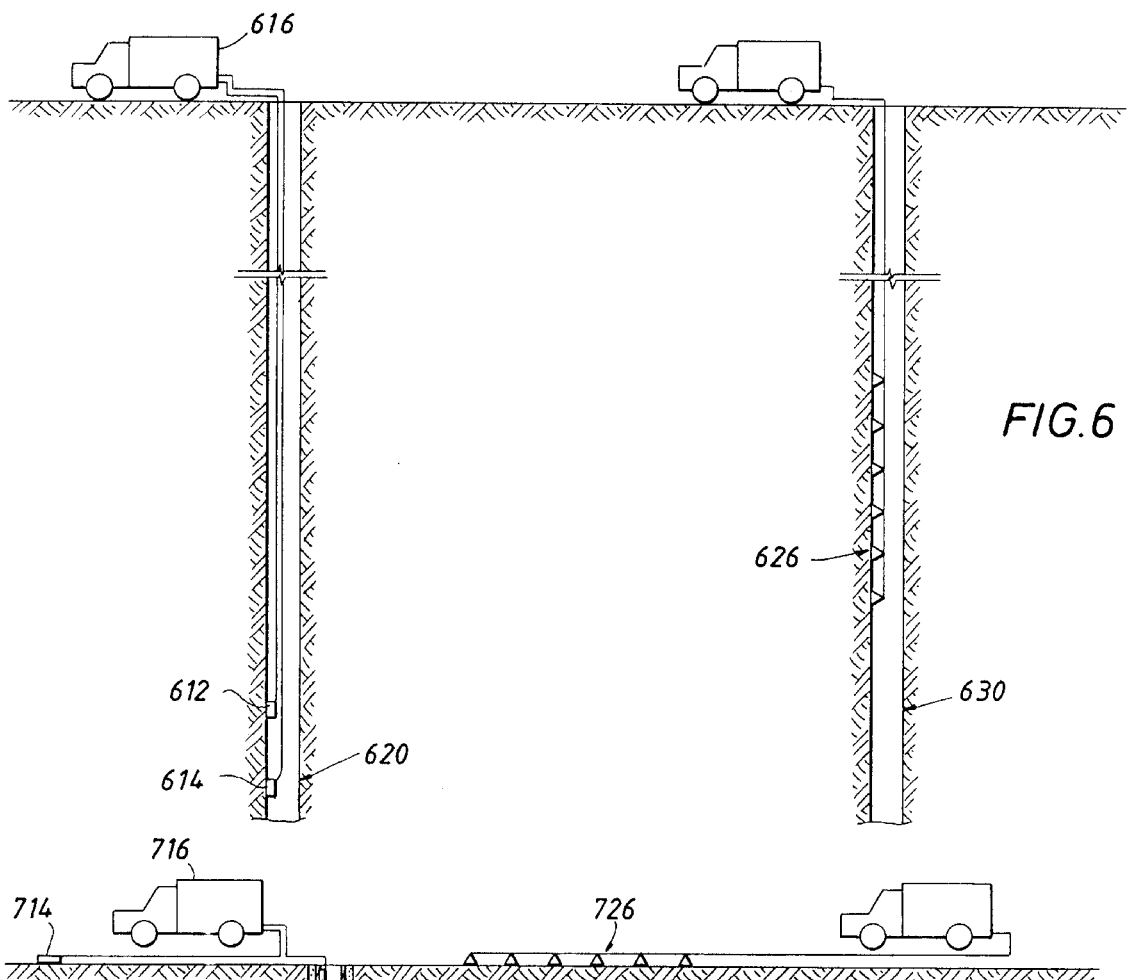
FIG. 6 is a simplified schematic representation of a different arrangement of the components of FIG. 1 in accordance with the teachings of the present invention.

In a similar manner, FIG. 6 depicts the positioning of the electrodes 612, 614 in one borehole 620 and the seismic detector array 626 in an adjacent borehole 630. Again, in accordance with the teachings of the present invention, a plurality of electrodes may be employed and/or their respective and/or overall locations in the borehole may be varied.

Thus, it may be seen that an additional embodiment of the present invention provides a method of conducting cross-borehole tomography. More particularly, it may be seen that this embodiment of the present invention employs the electric field to generate a seismic wave adjacent one borehole which may then be used to generate images by appropriate processing of the tomographic data received by detectors in a second adjacent borehole. The processing of the tomographic data to obtain information about the subsurface materials lying between the boreholes is conventional and well known in the art and, accordingly, is not discussed herein.

Figure 7:
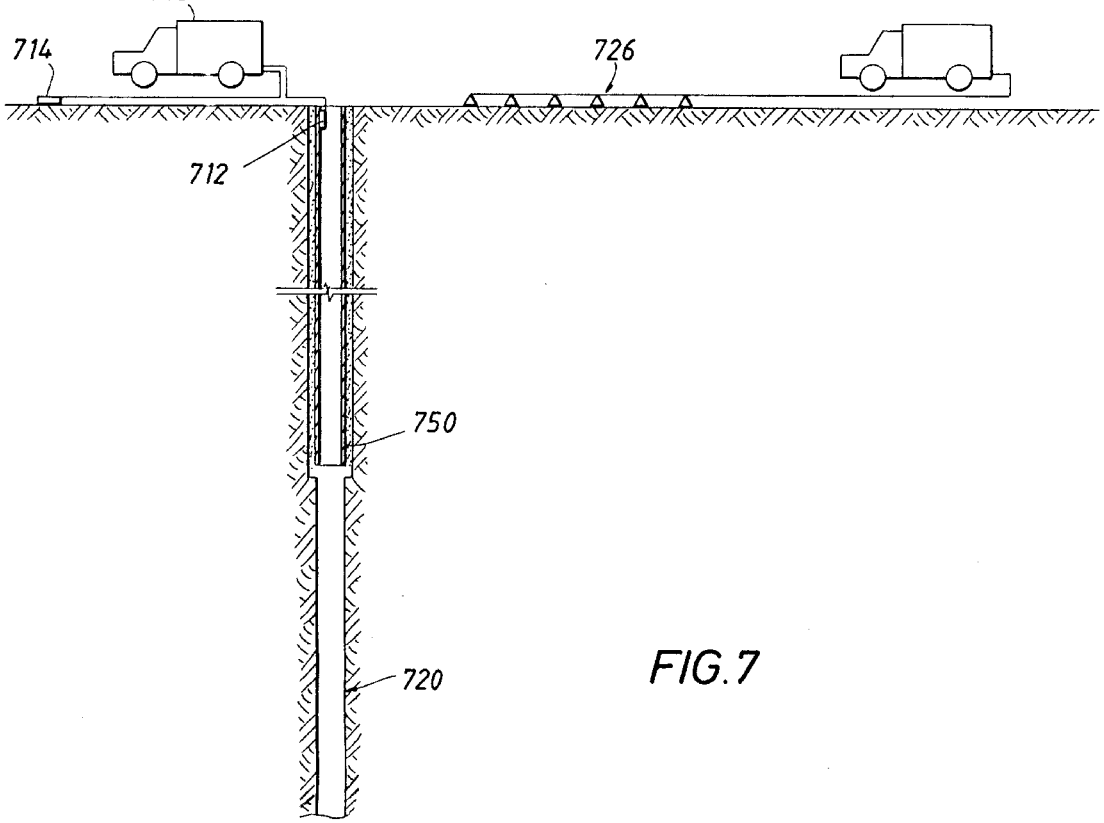
FIG. 7 is a simplified schematic representation of a modification of the components of FIG. 4 in accordance with the teachings of the present invention.

Referring now to FIG. 7, there may be seen a modification of the components of FIG. 4. More particularly, there may be seen a cased borehole 720, rather than the uncased borehole 420 of FIG. 4; that is, the borehole contains casing (or piping) 750 extending to some depth of the borehole. This casing 750 may be employed as an antenna to radiate an electric field into the subsurface earth. The casing is used as one electrode 712 and a second electrode 714 is located some distance (up to a mile or more) from the borehole. The casing and second electrode 714 are appropriately connected to a power source 716, as noted earlier herein. FIG. 7 also depicts a detector array 726.

In a similar manner, the components of FIGS. 5 and 6 may be modified for use in a cased borehole. That is, one electrode of the Figures may be the casing and the other electrode may be in the borehole or on or at the surface of the earth. Clearly, however, the arrangement of components depicted in FIGS. 4–6 may still be employed, even if the borehole is cased and without using the casing as an electrode; for these cases, the electrodes must be placed in non-cased portions of the borehole.

Further, the techniques of the present invention may be combined with those of U.S. Pat. No. 4,904,942, which as described earlier uses the acoustoelectric effect. The acoustoelectric technique provides for the detection of more porous formations, i.e., those with high permeabilities, which may be candidates for oil and gas reservoirs. The techniques of the present invention when used to explore the same subsurface area would provide for the detection of a low permeability cap or sealing rock on top of the proposed reservoir formations, as well as an estimate of the permeability of the cap rock. Neither the proposed reservoir nor the cap rock, which are easily detectable by the combination of the two techniques, may be detectable by conventional seismic prospecting techniques. More particularly, a direct indication of permeability (which is not available from conventional seismic data) is available from this combination of the two techniques. Thus, the combination of the two techniques can result in information not otherwise obtainable without drilling a borehole. Similarly, the two techniques may be employed to log a borehole.

Many other variations and modifications may be made in the apparatus and techniques hereinbefore described, by those having experience in this technology, without departing from the concepts of the present invention. Accordingly, it should be clearly understood that the apparatus and methods depicted in the accompanying drawings and referred to in the foregoing description are illustrative only and are not intended as limitations on the scope of the invention.

What is claimed is:

1. A method for geophysical prospecting of a preselected subsurface region, comprising;
   generating an electric field of sufficient strength to penetrate said preselected region to a depth of interest,
   converting said electric field to a seismic wave in at least one porous subsurface earth formation in said preselected region containing at least one fluid, and
   detecting said seismic wave with a seismic detector.

2. The method of claim 1, wherein said generating an electric field step, further comprises,
   providing an antenna,
   connecting a power source to said antenna, and
   generating an electric field with said antenna.

3. The method of claim 2, further comprising,
   placing said antenna in a borehole penetrating the subsurface, or on or in the surface of the earth.

4. The method of claim 2 wherein said source is a pulsed DC source or an AC source.

5. The method of claim 2, wherein said antenna comprises,
   at least two metal electrodes positioned partially in the earth.

6. The method of claim 5, further comprising,
   placing at least one electrode in a borehole penetrating the subsurface.

7. The method of claim 6, wherein said at least one electrode is borehole casing.

8. The method of claim 1, further comprising,
   placing said detector in a borehole penetrating the subsurface, or on or in the surface of the earth.

9. The method of claim 1 wherein said seismic detector comprises,
hydrophone, single-component geophone, two-component geophone, three-component geophone, or any combinations thereof.

10. The method of claim 1, further comprising,
recording said detected seismic signals.

11. The method of claim 1, wherein said at least one fluid comprises,
water, hydrocarbon, brine, petroleum, or combinations thereof.

12. The method of claim 1, wherein said converting step comprises,
generating fluid dipole motion in the pores of said at least one porous subsurface formation with said electric field, and
generating a seismic wave in said subsurface earth formation from said fluid dipole motion.

13. The method of claim 2, wherein said generating an electric field step comprises,
generating an electromagnetic field with said antenna to provide said electric field.

14. A method for logging subsurface formations penetrated by a borehole, comprising:
generating an electric field within said borehole with a power source,
converting said electric field to a seismic wave at a porous subsurface earth formation adjacent said borehole containing at least one fluid, and
detecting said seismic wave within said borehole with a seismic detector.

15. The method of claim 14 wherein said source is a pulsed DC source or an AC source.

16. The method of claim 14 wherein said seismic detector comprises,
hydrophone, single-component geophone, two-component geophone, three-component geophone, or any combinations thereof.

17. The method of claim 14, wherein said converting step comprises,
generating fluid dipole motion in the pores of said at least one porous subsurface formation adjacent said borehole with said electric field and
generating a seismic wave in said subsurface earth formation from said fluid dipole motion.

18. A method for generating seismic energy in a preselected subsurface region of the earth, comprising:
generating an electric field of sufficient strength to penetrate said preselected region to a depth of interest, and
converting said electric field to a seismic wave at a porous subsurface earth formation in said preselected region containing at least one fluid.

19. The method of claim 18, wherein said generating an electric field step, further comprises,
providing an antenna,
connecting a power source to said antenna, and
generating an electric field with said antenna.

20. The method of claim 19 wherein said source is a pulsed DC source or an AC source.

21. The method of claim 19, wherein said antenna comprises,
at least two metal electrodes positioned partially in the earth.

22. The method of claim 18, wherein said converting step comprises,
generating fluid dipole motion in the pores of said at least one porous subsurface formation with said electric field, and
generating a seismic wave in said subsurface earth formation from said fluid dipole motion.

23. Apparatus for geophysical prospecting, comprising:
means for generating an electric field, and
means for detecting a seismic wave which has resulted from the conversion of an electric field in at least one porous subsurface earth formation containing at least one fluid.

24. The apparatus of claim 23, wherein said means for generating an electric field comprises,
a pulsed DC or AC source.

25. The apparatus of claim 23, wherein said means for detecting comprises,
at least one seismic detector.

26. A method for cross-borehole tomography, comprising,
generating an electric field in a first borehole penetrating the earth,
converting said electric field to a seismic wave in at least one porous subsurface earth formation adjacent said first borehole and containing at least one fluid, and
detecting said seismic wave in a second borehole penetrating the earth and spaced from said first borehole.

27. A method for geophysical prospecting of a preselected subsurface region, comprising:
(a) generating an electric field of sufficient strength to penetrate said region to a depth of interest,
(b) detecting a seismic wave generated by said electric field interacting with fluid dipoles in at least one first porous subsurface earth formation in said region,
(c) generating a seismic wave of sufficient strength to penetrate said region to a depth of interest,
(d) detecting an electric field generated by said seismic wave interacting with fluid dipoles in at least one second porous subsurface earth formation in said region, and
(e) wherein steps (a) and (b) may be performed after or before steps (c) and (d).

28. The method of claim 25, wherein said generating steps occur in a borehole penetrating the subsurface and said detecting steps occur on or in the surface of the earth, or said generating steps occur on or in the surface of the earth and said detecting steps occur in a borehole penetrating the subsurface.

29. A method for logging subsurface formations penetrated by a borehole, comprising:
(a) generating an electric field within said borehole with a power source,
(b) detecting a seismic wave resulting from said electric field generated in said borehole interacting with fluid dipoles in at least one first porous subsurface earth formation adjacent said borehole,
(c) generating a seismic wave within said borehole, and
(d) detecting an electric field resulting from said seismic wave generated in said borehole interacting with fluid dipoles in at least one second porous subsurface earth formation adjacent said borehole, and
(e) wherein steps (a) and (b) may be performed after or before steps (c) and (d).

* * * * *